United States Patent [19]

Baker et al.

[11] Patent Number: 5,053,927

[45] Date of Patent: Oct. 1, 1991

[54] MOLDED FUZED SOLID ELECTROLYTE CAPACITOR

[75] Inventors: Richard D. Baker, Kennebunk; Robert L. Foisy, Sanford, both of Me.

[73] Assignee: Sprague Electric Company, North Adams, Mass.

[21] Appl. No.: 677,204

[22] Filed: Mar. 29, 1991

[51] Int. Cl.⁵ .......................... H01G 1/10; H01G 9/00
[52] U.S. Cl. .................................................. 361/534
[58] Field of Search ............... 361/534, 535, 536, 537, 361/538, 275

[56] References Cited

U.S. PATENT DOCUMENTS

| | | | |
|---|---|---|---|
| 3,335,328 | 8/1967 | Brackett | 317/101 |
| 4,107,762 | 8/1979 | Shirn et al. | 361/433 |
| 4,935,848 | 6/1990 | Yamane et al. | 361/534 |

OTHER PUBLICATIONS

R. W. Franklin, "Solid Tantalum Capacitors Incorporating Fuses", Carts-Europe '88 (Oct. 17–19, 1988) 2nd European Capacitor and Resistor Symposium.

Primary Examiner—L. T. Hix
Assistant Examiner—Le Nguyen

[57] ABSTRACT

A pocket within the molded casing of a solid electrolyte capacitor is of greater volume than a fuze passing through the pocket, thereby ensuring that the fuze will not reestablish its conductive path after being blown. The pocket is established between layers of polyester tape that insulate the cathode of the capacitor from its leadframe and protect the fuze from the molding material.

4 Claims, 1 Drawing Sheet

MOLDED FUZED SOLID ELECTROLYTE CAPACITOR

BACKGROUND OF THE INVENTION

This invention relates to molded solid electrolyte capacitors having internal safety fuzes, and more particularly to such a capacitor wherein a blown fuze remains open circuit.

It is known in the prior art to provide a solid electrolyte capacitor with a fuze embedded in the molded casing for the capacitor. One frequent problem with such prior art fuzed constructions is that thermal fuzes may function properly to provide an open circuit, and then the debris of the fuze and adjacent charred molding material may reestablish a conductive path so as to put the capacitor back in the circuit.

The use of an exothermically alloyable fuze in a solid electrolyte capacitor has been taught by Shirn and Maher in U.S. Pat. No. 4,107,762 to overcome most of the problems associated with the thermally fuzed constructions. However the expense of exothermic fuzes, and the considerable care that is demanded in attaching such fuzes without igniting them, mediate against their use except for costly circuitry.

Various efforts in the prior art to provide a solid electrolyte capacitor with a fuze that does not reunite after being blown have included encasing the fuze in a material that does not char. Other efforts have involved tailoring leadframes so as to function as fuzable links and/or the use of blow-out plugs in molded casings so as to permit escape of fuze debris from the casings.

It is an object of this invention to provide a molded solid electrolyte capacitor with a fuze construction wherein blowing of the fuze results in a permanent open circuit. Another object is to provide such a fuzed capacitor that does not suffer damage to the molded package upon the fuze being blown. Another object is the provision of a simplified construction that is accommodated within a conventional molded casing without imposing a need to enlarge the mold.

SUMMARY OF THE INVENTION

In accordance with this invention a solid electrolyte capacitor having an internal fuze is molded so that a volume within the molded casing is maintained free of the molding material. A major portion of the fuze is located within a minor portion of that free volume so that blowing of the fuze establishes a permanent open circuit not subject to reconnection of the fuze. The fuze is preferably the low cost thermal fuze that is well-known in the electrical arts. The prior art fault of permitting the reuniting of a thermal fuze and/or the adjacent charred molding material is prevented by making the free volume several times larger than the size of the fuze and by keeping the fuze out of contact with the molding material.

The fuze of this invention is positioned between layers of plastic tape. The tape layers form a pocket that is substantially larger than the portion of the fuze that passes through the pocket. The pocket provides sufficient free volume that debris from a blown fuze is incapable of reuniting into a fuze path. The plastic tape is preferably of a material that does not char at the fuzing temperatures, so as to further lessen any chance of reestablishing a conductive fuze path.

DESCRIPTION OF THE PREFERRED EMBODIMENTS

Figure 1:
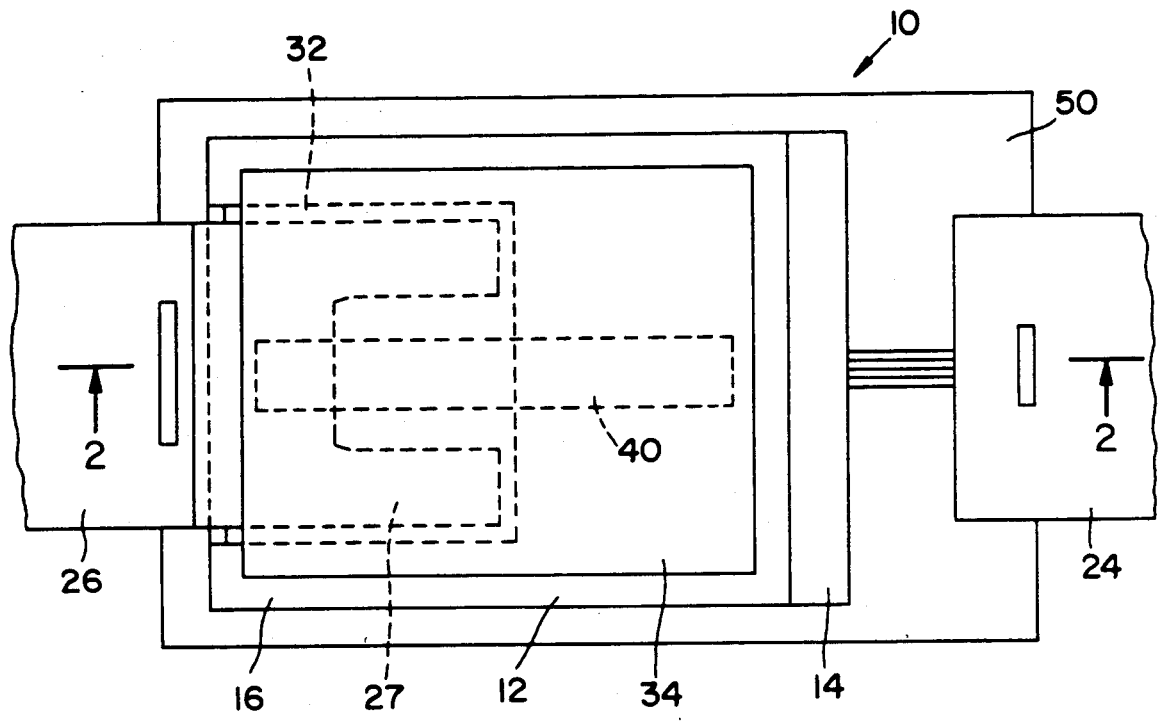
FIG. 1 is a plan view of a molded fuzed solid electrolyte capacitor of this invention with the top of the molded casing removed for ease in depicting the several layers of the cathode and the fuze.

The capacitor 10 of this invention includes a solid electrolyte capacitor body 12 having an anode end 14 and a cathode end 16. Capacitor body 12 is of conventional solid electrolyte capacitor construction well-known in the prior art.

Body 12 is provided with an anode riser 18 in electrical contact with the anode end 14. Riser 18 is joined to anode portion 24 of a conductive leadframe which performs the conventional functions of supporting the capacitor for later molding steps and providing the anode lead for connecting the molded capacitor into a circuit.

Cathode 16 of body 12 commonly employs an outer layer of silver-loaded resin, which by nature of the processing of body 12 exhibits a rough outer surface for connection to cathode portion 26 of the leadframe.

In accordance with this invention the rough surface of cathode 16 is mounted on leadframe 26 by a pair of non-conductive members 28 and 32. A yieldable layer 28 of non-conductive epoxy is employed as an intermediate to accommodate the rough cathode 16 to smooth surfaced leadframe 26. A layer of insulating plastic tape 32 is secured to leadframe portion 26 between epoxy layer 28 and the portion 26, so as to ensure that rough points on cathode 16 do not penetrate through the epoxy 28 to make contact with the metal leadframe.

Cathode portion 26 has a bifurcated end 27 which serves to support the cathode end 16 of capacitor body 12. Tape 32 is adhered to portion 26 including end 27 so as to extend across the gap between the bifurcated legs of end 27.

Fuze 40 provides electrical connection between leadframe portion 26 and cathode 16. Fuze 40 is joined to portion 26, and extends through the gap in end 27, and beyond tape 32, and into direct connection to cathode 16 of body 12.

An upper insulating tape 34 overlies the full length of fuze 40 and the full width of leadframe 26 including tape 32. The tapes 32 and 34 are separated by the thickness of leadframe 26, which is a greater thickness than the thickness dimension of fuze 40.

Figure 2:
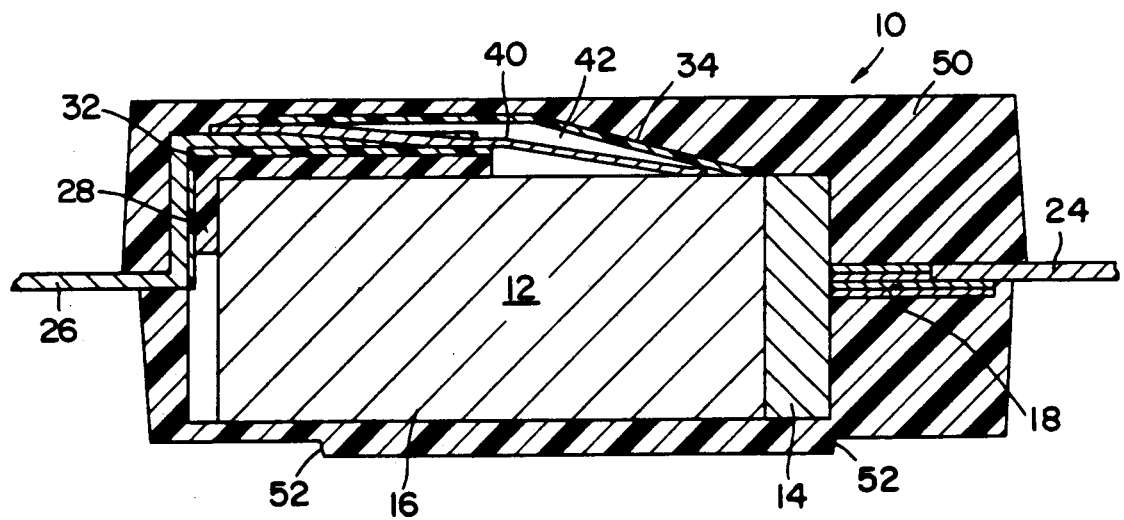
FIG. 2 is a cross-section of the complete capacitor taken along line 2—2 of FIG. 1.

As shown in FIG. 2, tapes 32 and 34 provide a sealed pocket 42 around fuze 40 and of substantially greater volume than the volume occupied by fuze 40. In the event that fuze 40 blows, the resulting debris is scattered throughout pocket 42 without chance to collect so as to reestablish an electrical path between leadframe 26 and cathode 16. The tapes 32 and 34 are preferably of polyester so as to avoid the charring problems of prior art fuzed capacitors.

Leadframe 24, 26 is of any conventional material employed in the molded capacitor art. A preferred material for leadframe 24,26 is known commercially as Alloy 42 which is 42% nickel and the rest is ferrous. The leadframe is 4.5 mils thick including a plating of 60–40 solder. The leadframe 26 is preferably joined to polyester tape 32 by means of an acrylic adhesive common to the tape art.

Fuze 40 is preferably of a thermal alloy because of the low cost and the ease of welding to surfaces such as offered by leadframe 26 and cathode 16. One preferred alloy is 93.5% wt % lead, 5.0 wt % tin, and 1.5 wt % silver. A ribbon of such an alloy having a cross-section of 0.2 mm by 0.07 mm melts at about 295° C. which is well below the ignition temperatures of the several materials utilized in solid electrolyte capacitors.

Capacitor body 12 including fuze 40 are provided with a molded casing 50 conventional in the capacitor art. Casing 50 provides a solid block which surrounds pocket 42 without stressing fuze 40 positioned within the free volume established by the tapes 32, 34 and bifurcated leadframe portion 27. Casing 50 supports the leadframe members 24 and 26 which are customarily folded around the capacitor to occupy the notches 52 to provide terminals for surface mounting of the capacitor on a wiring board.

What is claimed is:

1. A solid electrolyte capacitor comprising a capacitor body mounted on a leadframe, an anode riser from said body affixed to an anode portion of said leadframe in electrical connection therewith, a cathode of said body being mechanically secured to a paddle-shaped cathode portion of said leadframe in electrical isolation therefrom, said electrical isolation including a first insulating tape between said cathode and said paddle, a fuze overlying said first tape and providing electrical connection between said paddle and said cathode, a second insulating tape overlying said fuze and said first tape so as to define a pocket around said fuze, a casing molded around said body and said fuze with extensions from said anode portion and said cathode portion extending from said casing, and with said pocket being a free volume within said casing.

2. The capacitor of claim 1 wherein said paddle is bifurcated and said fuze extends between the legs of said paddle.

3. The capacitor of claim 2 wherein said first tape extends between said legs as well as under said legs.

4. The capacitor of claim 3 wherein said first tape and said second tape are of polyester and have an acrylic adhesive on a surface thereof.

* * * * *